Patented May 23, 1933

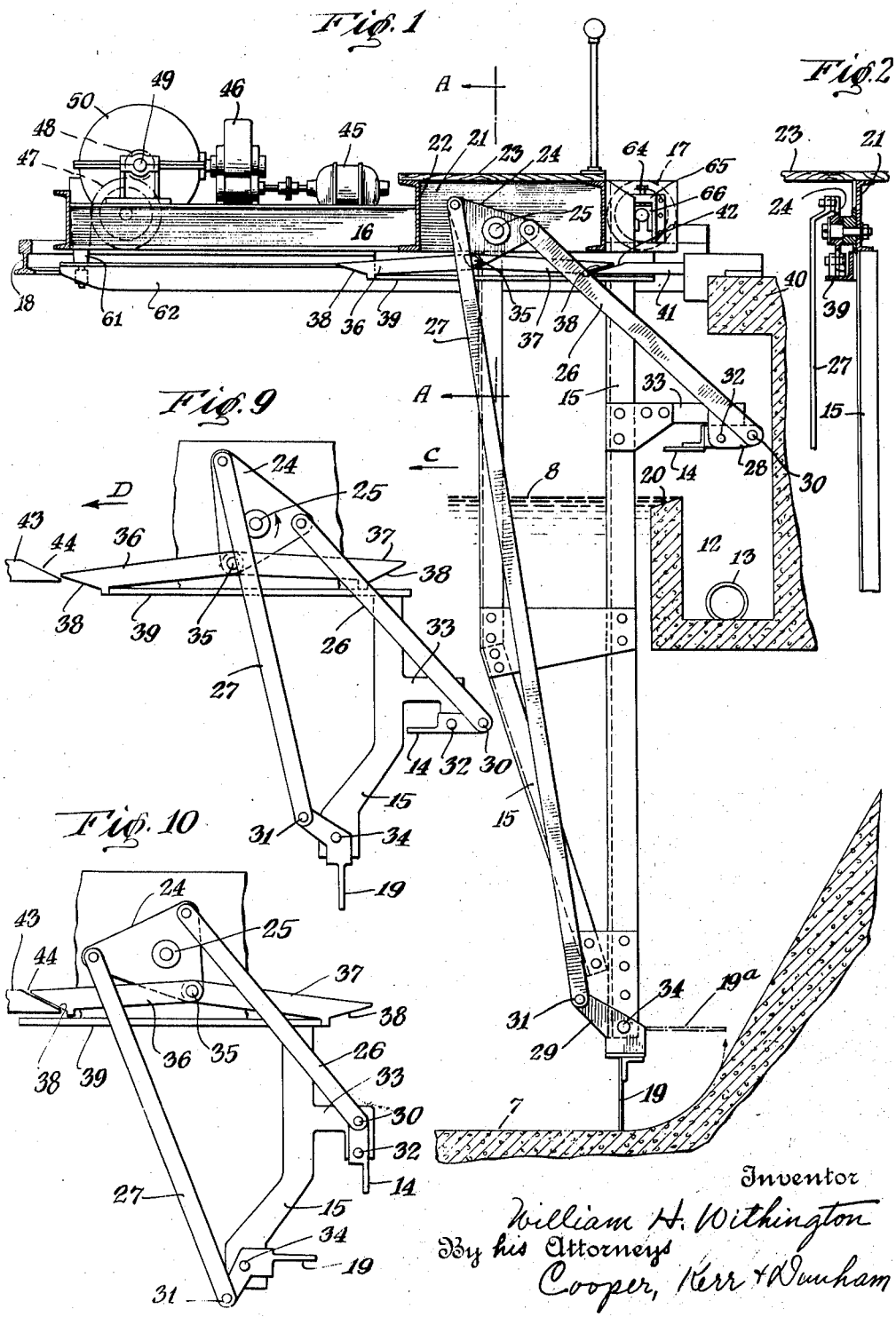

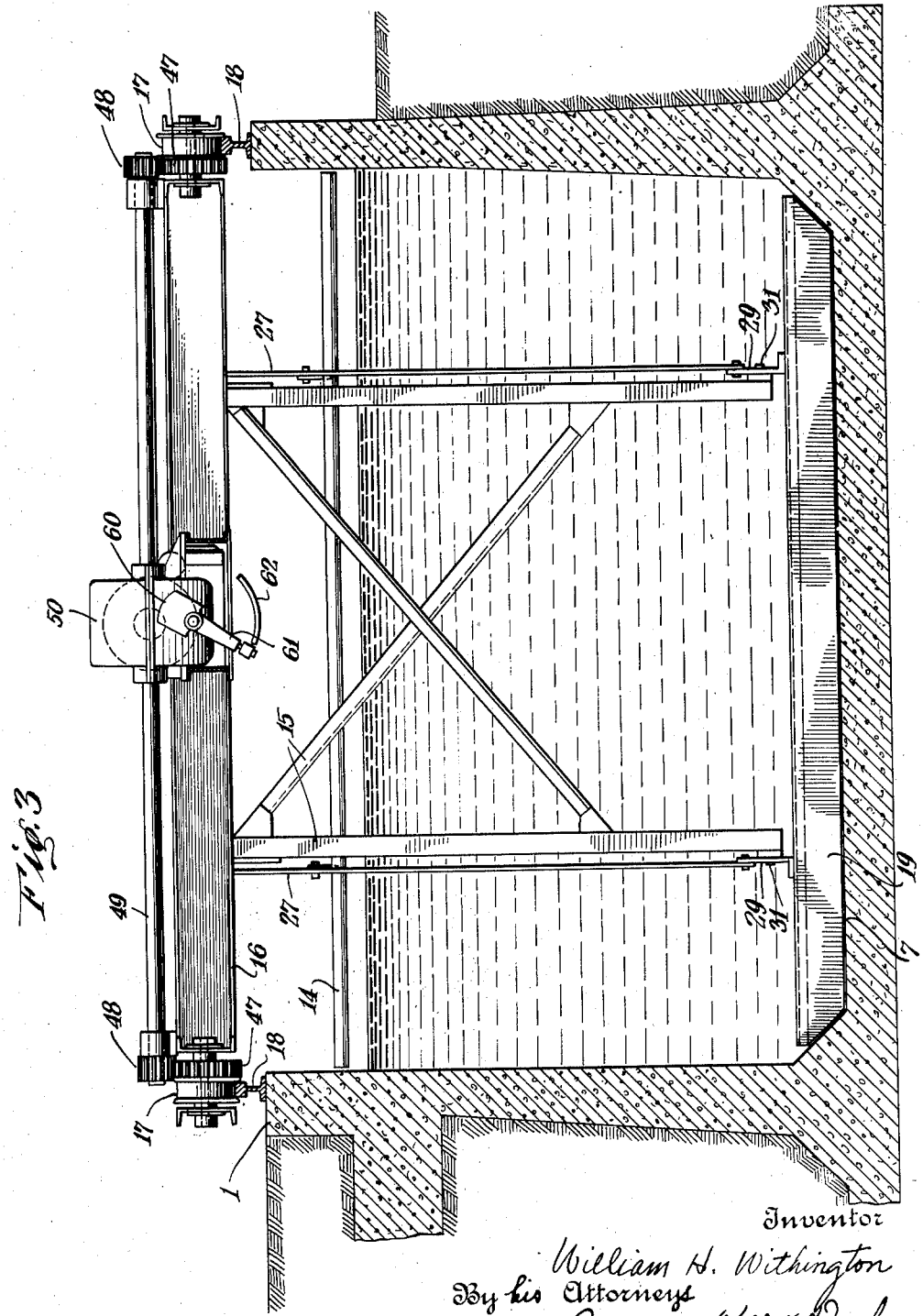

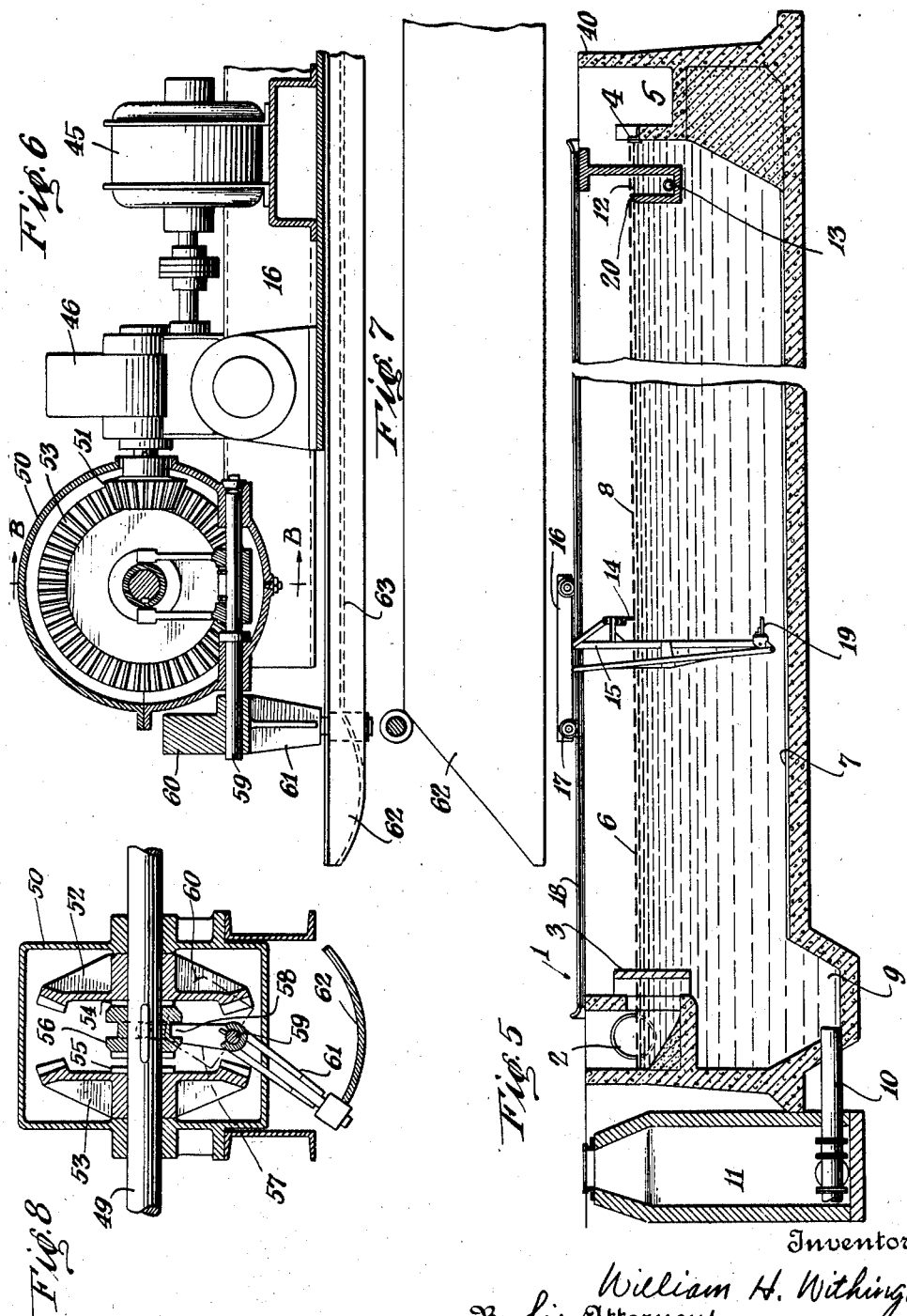

1,911,008

UNITED STATES PATENT OFFICE

WILLIAM H. WITHINGTON, OF NEW YORK, N. Y., ASSIGNOR TO HARDINGE COMPANY, INCORPORATED, OF YORK, PENNSYLVANIA, A CORPORATION OF NEW YORK

LIQUID CLARIFIER

Application filed December 4, 1930. Serial No. 499,900.

This invention relates to liquid clarifiers and more particularly to devices of that nature in which the substances to be removed from the liquid are caused to collect at the bottom or floor of a tank, or at the surface of the liquid, as in flotation thereon, or in many instances, at both places. Clarifiers of this character find, among other uses, wide employment in sewage disposal systems or the like, where it is desirable to remove from the sewer effluvium a considerable portion of the undissolved matter carried therein. In such cases, the liquid is passed into and through an appropriate settling tank, where much of the undissolved matter, being heavier than the liquid, settles to the bottom as sludge, while lighter or more finely divided substances tend to rise and form a layer or scum at the surface; the value of clarification carried on with such tanks depends, to a large extent, on the efficiency with which the sludge or scum is scraped away or otherwise removed.

In order to insure thorough sedimentation in sewage and other clarifiers where a sludge is thus caused to collect at the bottom of the liquid, agitation of the latter, as by its flow in and out, may conveniently be avoided by using a tank of considerable horizontal area, and of substantially rectangular plan. Such shape is advantageous for other reasons as well, notably ease of construction, economy of space, and adaptability to handle large quantities of liquid. Heretofore, however, clarifiers of the type described have been inefficient and slow in operation, especially with such tanks, and adapted inadequately, if at all, to the automatic removal of sludge or, since the formation of scum is not infrequent, of sludge and scum, or to the repeated removal of the same.

Accordingly, one object of the present invention is to provide a clarifier having a rectangular tank and having means for automatically and, if desired, repeatedly removing sludge or other substances collected at the bottom of the tank.

A second object of the invention is to provide such a clarifier which may be operated to scrape sludge across the floor of the tank to a convenient place for withdrawal, and which may be simply and automatically conditioned for repetition of the operation.

Another object is the provision of a clarifier having means for repeatedly and automatically removing sludge from the bottom and scum from the top of a body of liquid.

A further object is to provide a clarifier with sludge-scraping means movable back and forth across the floor of a rectangular tank, but operable to scrape sludge in one direction only for removal at a predetermined place in the tank.

Still further objects of the invention are to furnish a clarifier of the class indicated, which has a sludge-removing cycle of operation of any predetermined scope, and is capable of automatically repeating that cycle as desired; and to furnish a clarifier of that character in which both sludge and scum are removed in each cycle of operation.

Another object is the provision of mechanical clarifying means readily and simply adaptable for use in tanks of a wide variety of sizes and shapes.

It is also an object of the invention to effect the removal of undissolved substances which may collect in a predetermined stratum of a liquid, by providing means for continuously and effectively scraping up such substances to one or more places for withdrawal; and further objects comprehend the provision of scraping means of that nature, which will operate for scraping in one direction or which will otherwise avoid undue agitation of the liquid, and the provision of such scraping means adaptable to predetermine the amount or depth of scraping as desired.

Additional objects are to provide clarifiers of the class described for removing undissolved substances from a liquid more rapidly and thoroughly than in devices hitherto available, and to effect the clarification of continuously flowing liquids by means which cooperate more effectively with the flow of such liquids than did arrangements previously known.

Yet another object is to improve the scraping mechanism in clarifiers of such nature and at the same time to improve the various means for withdrawing such substances as are scraped up, whereby the latter cooperate more thoroughly with the scraping mechanism, and are generally more effective in operation.

To these and other ends the invention comprises the novel features and combinations hereinafter described.

One form of the invention is shown in the accompanying drawings, in which:

Figure 1 is a side elevation, partially in section, of the scraping carriage and mechanism and a portion of the tank;

Fig. 2 is a section on line A—A of Fig. 1;

Fig. 3 is an end elevation of the scraping carriage and mechanism, showing the tank in section;

Fig. 5 is a longitudinal vertical section of the clarifier tank, showing the arrangement of the scraping carriage and mechanism therein;

Fig. 6 is a side elevation, partially in section, of the carriage driving mechanism;

Fig. 7 is a plan view of the reversing stop for the mechanism of Fig. 6;

Fig. 8 is a section on line B—B of Fig. 6; and

Figs. 9 and 10 are side elevations of the scraping mechanism, structurally simplified, and respectively showing successive positions of the same during a cycle of operation.

Figure 4:
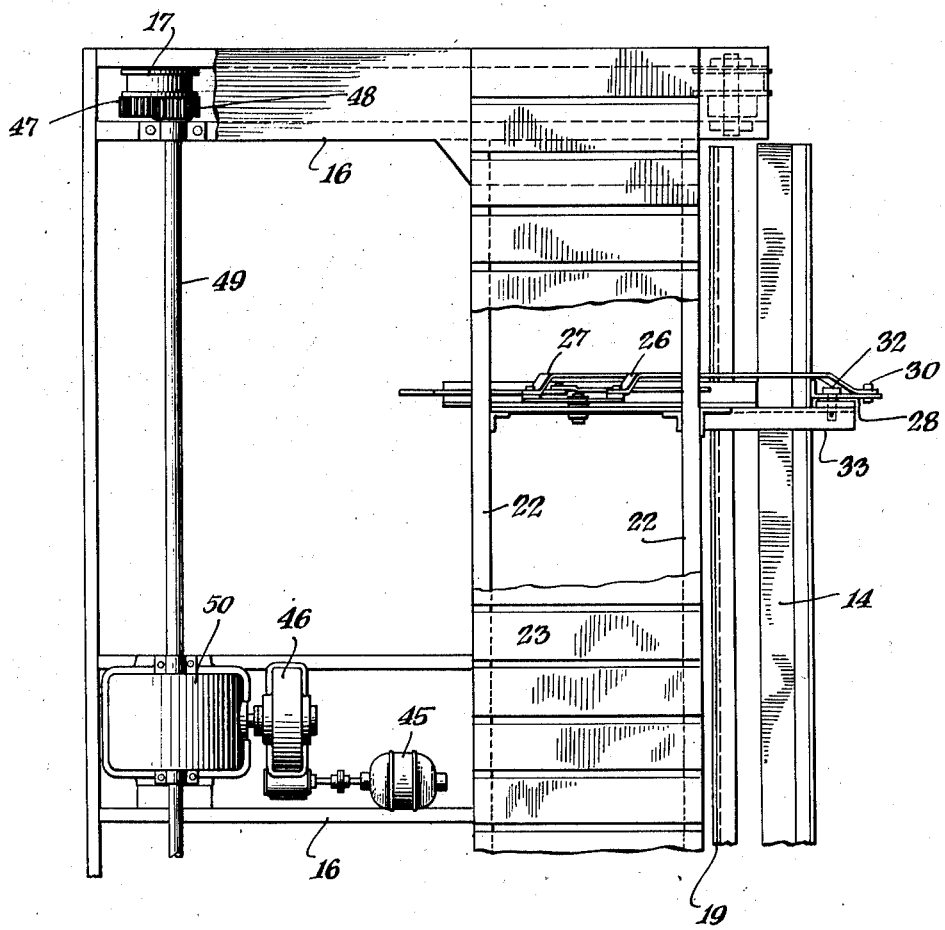
Fig. 4 is a plan view of a portion of the scraping carriage and mechanism, with parts of the carriage cut away.

The clarifier embodying the invention as illustrated has a settling tank such as tank 1 in Fig. 5, in which the sewage or other liquid to be clarified is contained. The tank 1 may have suitable ports, drains, or gates for the ingress and egress of liquid, which may be passed continuously or intermittently therethrough, as desired. In the device illustrated, for example, sewage flows into the tank through port 2 and under baffle 3 and is withdrawn over weir 4 into trough 5, the liquid level thereby maintained being represented by the dotted line 6.

As the sewage passes through the tank, or is retained in the latter, a considerable portion of the heavier undissolved matter falls to the bottom 7 and collects there as a sludge, while lighter substances tend to rise and form a scum at the surface 8. To remove the sludge, means are provided for scraping the same to one or more places in the tank, such as the sludge hopper 9, for withdrawal, as by pipe 10 into sump 11. Removal of scum may be accomplished by scraping or sweeping it across the surface of the liquid to one or more suitable collectors, such as trough 12, for similar withdrawal, as by drain 13. Although the positioning of these withdrawal devices at opposite ends of the tank is for some purposes advantageous, as will hereinafter appear, they may usefully be disposed otherwise, as for instance, at the same end or ends of the tank, or at the center of the latter, provided of course, that the sweeping or scraping means are appropriately modified for cooperation with the troughs, hoppers, or the like in such other positions.

The scum scraping means may consist of one or more sweepers, such as the blade 14 carried by framework 15 and having its lower edge placed just below, or just at, or just above the surface of the liquid. In order to move the blade along the tank and over the liquid surface, the framework 15 is secured to a traveling support, which may comprise a carriage or traveling bridge 16 having wheels 17 capable of travel on rails 18 disposed lengthwise of the tank and conveniently along the sides of the latter. As hereinafter explained, the blade 14 can be tilted relative to its support, so that when desired it may be moved by the carriage without operating to sweep the surface of the liquid. Means for gathering sludge from the bottom of the tank may be embodied in one or more scrapers, such as blade 19, likewise carried by framework 15 and movable relative to the latter, being here shown (Fig. 5) tilted up out of scraping position. The location of blades 14 and 19 relative respectively to the surface of the liquid and the floor of the tank, and also the arrangement of carriage 16, wheels 17, and rails 18 may be readily seen in Fig. 3, an end view of the carriage and framework, in which drawing the blade 19 is shown tilted downward to a position for scraping up sludge along the floor 7, and the blade 14 tilted upward out of sweeping position.

It may appropriately be noted here that the arrangement of the in-flowing sewage port and sludge hopper at the same end of the tank is of particular advantage for sewage clarification, since, among other reasons, it has been found that a relatively considerable quantity of material settles on the first quarter of the tank floor adjacent the point of ingress of sewage, and accordingly, desirable removal of sludge is obtained if the scraper blade need only push this great quantity of material across the small portion of the floor on which it settles. This method of operation is carried out, as is seen, in a clarifier having an arrangement of tank and blades such as has been described hereinabove.

In order that the sweepers or scrapers may cooperate in desirable manner with the various withdrawal devices which the clarifier tank may have, and may operate to the greatest advantage otherwise, means may be provided for automatically tilting the various blades, so that one or more of them will be in operative position when the carriage is traveling in one direction only or over but one portion of the tank, while another blade or set of blades or, as may frequently be desired, no blades at all will be in operative position when the carriage is traveling in the opposite direction only or over a different portion of the tank. To insure certainty of operation, especially where the carriage is continuously self-propelled (as is carriage 16, by mechanism hereinafter described), the automatic blade-tilting means may preferably be actuated when the carriage reaches certain predetermined points in its course of travel, such as, for example, the ends of the tank. The actuation of such means may be through the control of whatever propelling mechanism the carriage has, and thus in some cases electrically operative, or it may be entirely mechanical or otherwise separated from the propelling mechanism. As will now be understood, the timing of the blade-tilting means and the selection of blades to be placed in or out of operative condition at each actuation thereof, will depend on, among other things, the general structural arrangement of the tank to be used. In the embodiment of Fig. 5, for instance, the tilting mechanism is such that when the carriage is traveling from left to right, in the direction of the arrow, blade 14 is down and sweeping scum toward and into trough 12, while blade 19 is up in non-operative state, and by reason of its horizontal position avoids such undue agitation of the liquid as would interfere with the quiet settling of sludge at the bottom of the tank, but when the carriage is on its return trip from right to left, blade 14 is up and away from the surface of the liquid, and blade 19 is down and operative to scrape sludge toward and into hopper 9.

This tilting mechanism may be constructed, as explained, in various ways, a convenient arrangement being illustrated in Fig. 1. Here the carriage is shown after it has traveled to the extreme right end of the tank of Fig. 5, after the sweeper blade 14 has carried its gathering of scum into trough 12 over the outer side 20 of the latter, and after the tilting mechanism has operated to reposition the blades for the return trip in the direction of arrow C. The carriage 16 has an upright portion 21 which together with other upright portions or beams 22 serves to support an inspection platform 23, shown also in Fig. 4. The blade-supporting structure 15 comprising a suitable frame of beams and cross-members (see Fig. 3), adjacent to which on either side a blade-tilting mechanism may be placed, extends below this platform. Although the embodiment here illustrated has two such blade-tilting mechanisms, one of which is in view in Fig. 1 (the opposite mechanism being shown in Fig. 3 with identical parts being indicated with the same numbers as in Fig. 1) it will be understood that one or any other convenient number of these mechanisms may be used. Referring now to Figs. 1 and 2, the tilting mechanism has a linkage-plate 24 pivotally carried on the upright portion 21 by means of a bolt 25. At suitable points on the linkage-plate 24 levers 26, 27 are pivoted thereto, and at their opposite extremities are again pivoted respectively to tilting-arms 28, 29 at the respective ends 30, 31 of the latter. Arm 28 is pivotally mounted at 32 on a bracket 33 extending from the framework 15 and carries at its other extremity opposite end 30, scrum-sweeper blade 14. The location of bracket 33 and the proportions of arm 28 are such that when the latter is rotated about its central pivot 32 to an upright position, the blade will then be properly disposed for sweeping the surface of the liquid. Arm 29 is pivotally mounted at 34 on a lower portion of the framework 15 and supports sludge-scraping blade 19 in such way that when the arm is in the position shown, the blade is adapted to scrape sludge across the floor of the tank, but when the arm is rotated counter-clockwise about its central pivot 34, the blade assumes the horizontal, non-operative position represented by dotted lines 19a.

It will now be seen that rotation of arms 28, 29, to place the attached blades in and out of operative state, may be achieved by appropriately displacing levers 26, 27. Since in the form shown it is desired, as hereinbefore explained, to keep scraper blade 19 down when sweeper blade 14 is up, and vice versa, the linkage of levers 26, 27 to plate 24 is such that simple rotation of the latter through about 90 degrees will move the levers to place the blades in one or the other of the desired positions. To accomplish this rotation automatically, the plate 24 carries on a third pivot 35 two laterally extending locking levers 36, 37 each of which is wedge-shaped at its outer extremity and carries near the latter a downwardly extending locking projection 38 as shown. Beneath these levers and secured to the carriage 16, a guide plate 39 is disposed, this plate being capable of engaging at either extremity the inner face of the locking projection 38 adjacent thereto and also serving as a rest for the other locking projection. The end wall 40 of the tank is provided with a stop 41 having at its outer end a camming surface 42 adapted to engage the wedge-shaped end of lever 37 and cam the same upwardly, so that further movement of the carriage slides guide 39 underneath stop 41 until the projection 38 of lever 36 drops over the left hand end of the guide, when the parts are in the position shown. This lateral displacement of the levers and their pivot 35 past guide 39 and hence past the carriage has thus served to rotate plate 24, moving levers 26, 27 and the corresponding blades into the position illustrated.

The operation of these parts may be more readily understood by reference to simplified Figs. 9 and 10, where the carriage is seen at the opposite end of the tank, which is equipped with a similar stop 43 having a similar camming surface 44. In Fig. 9, the carriage is shown approaching in the direction of arrow D, the parts being in the position shown in Fig. 1, with blade 19 down for scraping, and blade 14 up clear of the liquid surface. As lever 36 strikes surface 44 it is cammed up and held by the latter, while the motion of the carriage past lever 36 causes the latter to rotate linkage-plate 24 in the direction of the arrow thereon. Rotation of the plate and attendant rotation, through levers 26, 27 of arms 28, 29 in a counter clockwise direction continues until the carriage has moved to the position of Fig. 10, where the locking projection of lever 37 has dropped over the left hand end of the guide. The sweeper-plate 14 being then down for sweeping, and the scraper-plate up clear of the bottom, the carriage is ready for its return trip to the right. It may also be noted that when traveling in either direction the pressure of the guide plate against the locking projection ahead of it serves to lock the blades in proper position for travel in that direction, as well as to assist in setting the blades at the end of each trip.

As illustrated, the specific mechanism here described, has one sweeper-blade and one scraper blade, but it will now be readily understood that additional blades of either variety may be added, and their operation controlled by additional levers or linkage similar to the parts shown and connected therewith. The timing of the tilting mechanism is, as has been seen, dependent on the position of stops, such as stops 41 and 43, and in practicing the invention, the actuation of the mechanism may be readily predetermined at any point over the tank by making these stops extend a greater or less distance out from the end of the tank. Furthermore, although in the clarifier here shown the sweeper and scraper blades extend laterally across the entire width of the tank, they may be constructed otherwise. The construction of the blades themselves may vary considerably; they may be made of stiff material, or may be flexible or resilient.

Means for propelling the carriage back and forth over the tank, preferably at a slow speed to avoid undue agitation of the liquid, may be provided by an electric motor 45 coupled through reducing traveling gears 46 on the carriage as shown, although other devices may conveniently be used. Referring particularly to Figs. 3 and 4, power is transmitted to the wheels 17 by means of gears 47 carried by the latter and meshing with pinions 48 carried at opposite ends of the drive shaft 49, which may be suitably coupled to the reducing gears 46. Since it is desirable to drive the carriage continuously back and forth across the tank, appropriate reversing means capable of operating as the carriage approaches or reaches either end of the tank may be employed. A device of the latter class is embodied in the mechanism assembled in housing 50 and illustrated in detail in Figs 6 and 8.

Referring to the last named figures, bevel pinion 51 driven by reducing gears 46 and thus by motor 45, meshes continuously with bevel gears 52, 53, driving the latter in opposite directions, as will be understood. These bevel gears are carried on shaft 49 but are freely rotatable about the latter and have on their inner and opposing faces, clutch jaws 54, 55, respectively, adapted to engage cooperating jaws on the outer faces of clutch member 56, which is keyed to shaft 49 by a sliding key and disposed between the two gears. The two jaw clutches thus constituted by the member 56 and cooperating gears on either side may be alternately engaged by sliding the clutch member to one side or the other, and shaft 49, keyed to the member, will correspondingly be driven in one direction or the other, according as it is driven by gear 52 or gear 53. Shifting of the member is accomplished by yoke 57, engaging groove 58 in the member and carried by shaft 59 on the outer end of which shaft is a counterweight 60, capable of holding the cluch member, in either engaging position, against accidental disengagement. Automatic shifting of the clutch member and consequent reversal of drive as the carriage reaches the end of the tank or any other predetermined point is achieved by means of a trip lever 61 mounted on shaft 59 and a stop 62 extending lengthwise from the end of the tank and having a laterally extensive camming surface 63 at its outer extremity (see Figs. 1 and 7) the position and relation of these parts being such that when the carriage reaches the end of the tank, lever 61 strikes the stop 62, and being cammed over by surface 63, rotates shaft 59 sufficiently to shift member 56, as described, thus reversing the drive of the carriage.

The operation of the clarifier, will now be readily understood. Propelled by motor 45 and gears 46 and 50, the carriage travels to the right across the tank, sweeping scum as it goes. When it reaches the end of the tank, trip lever 61 is engaged and operated by stop 62, and the carriage starts off on its return trip; meanwhile the automatic blade tilting mechanism, here conveniently actuated at the end of the tank also, has operated and the blade 19 is down in position for scraping sludge to the left as shown in Fig. 1. On reaching the opposite end of the tank, similar reversals of operation occur, and it will be seen that the carriage may thus travel continuously back and forth, automatically and repeatedly sweeping scum and scraping sludge.

In order to adjust the carriage for most desirable operation, and to predetermine the position of the sweeper and scraper blades relative respectively to the surface of the liquid and the floor of the tank so that, for instance, difficulties of operation due to irregularities in the latter can be obviated, the carriage may advantageously be provided with a pair of raising screws 64, each cooperating with one of a pair of opposite wheels 17. One of such screws is shown in Fig. 1, where, threaded through a suitable support 65 on the carriage and resting on the vertically shiftable bearing 66 of wheel 17, it may be screwed up or down to raise or lower the carriage with respect to wheel 17, and thus to raise or lower the frame 15 and sweeper and scraper blades carried thereon.

It is to be understood that the invention is not limited to the specific construction herein illustrated and described but can be embodied in other forms without departure from its spirit as defined by the following claims.

I claim:

1. A clarifier for sewage and the like, comprising a tank, a carriage movable back and forth thereover, a frame depending from the carriage towards the level of the liquid in the tank, a tiltable scum remover carried by said frame for sweeping floating scum, and leverage mechanism brought into action in accordance with the direction of travel and position of the carriage for effecting tilting shifting movement of the scum remover.

2. A clarifier for sewage and the like, comprising a tank, a carriage movable back and forth thereover, a frame depending therefrom and extending towards the bottom of the tank, a sludge scraper tiltably supported upon said frame and tiltable from scraping position to non-scraping position, and leverage mechanism brought into action by the direction of travel and position of said carriage for effecting tilting shifting movement of said scraper.

3. A clarifier for sewage and the like comprising a tank, a carriage movable back and forth thereover, a scum skimmer carried by the carriage, a scum trough at one end of the tank adapted to receive scum which is swept forward by the skimmer, a sludge scraper for the bottom of the tank also carried by the carriage and a sludge hopper for the sludge at the end of the tank opposite from the scum trough and adapted to receive the sludge scraped from the bottom of the tank by the sludge scraper, and means controlled by the movement of the carriage for controlling the operation of the scum skimmer and the sludge scraper, whereby said skimmer is operative only when the carriage moves towards the scum trough and the sludge scraper is operative only when the carriage moves towards the sludge hopper.

4. In a settling device the combination of a tank, scraper means in said tank, means for moving the scraper over the bottom of the tank in one direction, leverage mechanism operative when the scraper is moved in the opposite direction for raising the scraper away from the bottom of the tank, and means for removing the settled and scraped substances from the tank.

5. An apparatus of the class described comprising in combination, a settling tank which is substantially rectangular in shape, a structure adapted to travel along the tank, a scraper means supported thereby and disposed adjacent the bottom of the tank, means for moving the scraper means across the tank, and leverage mechanism for moving the bottom of the scraper means away from the bottom of the tank, said mechanism comprising means for pivotally turning the scraper means at an angle to the scraping position.

6. A clarifier for sewage and the like comprising a tank, a carriage movable thereover, scum sweeping means suspended from the carriage and including a transversely disposed pivoted blade for engaging the floating scum in the tank, sludge scraping means suspended from the carriage and including a transversely disposed pivoted blade for engaging the sludge in the bottom of the tank, both of said blades being movable from substantially vertical to substantially horizontal positions, means for moving the carriage, and means controlled by the operation of the carriage for varying the respective positions of the scum sweeping means and the sludge scraping means.

7. A clarifier for sewage and the like comprising a tank, a carriage movable thereover, scum sweeping means for floating scum and sludge scraping means for the bottom of the tank suspended from said carriage, means for moving the carriage alternately in opposite directions, and means controlled by the movement of the carriage for varying the respective positions of the scum sweeping means and the sludge scraping means, whereby the scum sweeping means is maintained in an inoperative position when said carriage moves in one direction and is maintained in an operative position when said carriage moves in the opposite direction and the sludge scraping means is maintained in an operative position when said scum sweeping means is in an inoperative position and in an inoperative position when said scum sweeping means is in an operative position.

8. A clarifier for sewage and the like comprising a tank, a carriage movable thereover, scum sweeping means for floating scum and sludge scraping means for the bottom of the tank suspended from said carriage, means for moving the carriage alternately in opposite directions, and means controlled by the movement of the carriage for varying the respective positions of the scum sweeping means and the sludge scraping means whereby said means are alternately maintained in inoperative positions when said carriage moves in one direction and are alternately maintained in operative positions when said carriage moves in the opposite direction.

9. A clarifier for sewage and the like comprising a tank, a carriage movable thereover, scum sweeping means movable into and out of scum sweeping position, sludge scraping means movable into and out of sludge scraping position and independent of said scum sweeping means, and means operable by the movement of the carriage for controlling the respective positions of said scum sweeping means and the sludge scraping means.

10. A clarifier for sewage and the like comprising a tank, a carriage movable thereover, scum sweeping means including a blade movable into and out of scum sweeping position, sludge scraping means including a blade movable into and out of sludge scraping position, means for moving the carriage over the tank, and means operable by the movement of the carriage for selectively controlling the respective positions of the scum sweeping means and the sludge scraping means.

11. A clarifier for sewage and the like comprising a tank, a carriage movable thereover, scum sweeping means including a blade movable into and out of scum sweeping position, sludge scraping means including a blade movable into and out of sludge scraping position, means for moving the carriage over the tank, and means operable by the movement of the carriage for independently controlling the respective positions of the scum sweeping means and the sludge scraping means.

12. A clarifier for sewage and the like comprising a tank, a carriage movable back and forth over the tank, scum sweeping means suspended from the carriage and including a transversely disposed pivoted blade for engaging the floating scum in the tank, sludge scraping means suspended from the carriage and including a transversely disposed pivoted blade for engaging the sludge in the bottom of the tank, both of said blades being movable from substantially vertical to substantially horizontal positions, a motor mounted upon said carriage for displacing said carriage, reversing gearing for reversing the direction of drive of said carriage from said motor, means controlled by the operation of the carriage for controlling the respective positions of the scum sweeping means and the sludge scraping means, and means brought into action in accordance with the direction of travel and position of said carriage for controlling the operation of said reversing gearing.

13. A clarifier for sewage and the like comprising a tank, a carriage movable back and forth over the tank, scum sweeping means suspended from the carriage for engaging the floating scum in the tank, sludge scraping means suspended from the carriage for engaging the sludge in the bottom of the tank, a motor mounted upon said carriage for displacing said carriage, reversing gearing for reversing the direction of drive of said carriage from said motor, and means brought into action in accordance with the direction of travel and position of said carriage for controlling the operation of said reversing gearing.

14. A clarifier for sewage and the like comprising a tank, a carriage movable back and forth over the tank, scum sweeping means carried by the carriage and displaceable therewith, said scum sweeping means being displaceable into scum sweeping position and to another position to clear the scum and permit a retrograde movement of the scum remover clear of the liquid in the tank, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the position of said scum sweeping means in accordance with the direction of travel of said carriage.

15. A clarifier for sewage and the like comprising a tank, a carriage movable back and forth over the tank, sludge scraping means carried by the carriage for scraping sludge from the bottom of the tank, said scraper means being relatively displaceable from a scraping position to a non-scraping position in accordance with the direction of travel of said carriage, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the position of said sludge scraping means.

16. A clarifier for sewage and the like comprising a tank, a carriage movable back and forth over the tank, scum sweeping means and sludge scraping means carried by the carriage and displaceable therewith, said scum sweeping means being displaceable into scum sweeping position and to another position to clear the scum and permit a retrograde movement of the scum remover clear of the tank, said sludge scraper means being relatively displaceable from a scraping position to a non-scraping position, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the relative positions of said scum sweeping means and said sludge scraping means in accordance with the direction of travel of said carriage.

17. A clarifier for sewage and the like comprising a tank, a carriage movable back and forth over the tank, scum sweeping means and sludge scraping means carried by the carriage and displaceable therewith, said scum sweeping means being displaceable into scum sweeping position and to another position to clear the scum and permit a retrograde movement of the scum remover clear of the tank, said sludge scraper means being relatively displaceable from a scraping position to a non-scraping position, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the relative positions of said scum sweeping means and said sludge scraping means in accordance with the direction of travel of said carriage, whereby the scum sweeping means is maintained in an inoperative position when said carriage moves in one direction and is maintained in an operative position when said carriage moves in the opposite direction and the sludge scraping means is maintained in an operative position when said scum sweeping means is in an inoperative position and in an inoperative position when said scum sweeping means is in an operative position.

18. A clarifier for sewage and the like comprising a tank, a carriage movable back and forth over the tank, scum sweeping means and sludge scraping means carried by the carriage and displaceable therewith, said scum sweeping means being displaceable into scum sweeping position and to another position to clear the scum and permit a retrograde movement of the scum remover clear of the tank, said sludge scraper means being relatively displaceable from a scraping position to a non-scraping position, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the relative positions of said scum sweeping means and said sludge scraping means in accordance with the direction of travel of said carriage, whereby said scum sweeping means and said sludge scraping means are maintained in inoperative positions when said carriage moves in one direction and are maintained in operative positions when said carriage moves in the opposite direction.

19. A clarifier for sewage and the like comprising a tank, a carriage movable back and forth over the tank, scum sweeping means and sludge scraping means carried by the carriage and displaceable therewith, said scum sweeping means being displaceable into scum sweeping position and to another position to clear the scum and permit a retrograde movement of the scum remover clear of the tank, said sludge scraper means being relatively displaceable from a scraping position to a non-scraping position, a motor mounted upon said carriage for displacing said carriage, reversing gearing for reversing the direction of drive of said carriage from said motor, means brought into action in accordance with the direction of travel and position of said carriage for controlling the operation of said reversing gearing, and means controlled by the movement of said carriage for controlling the relative positions of said scum sweeping means and said sludge scraping means in accordance with the direction of travel of said carriage, whereby said scum sweeping means and said sludge scraping means are alternately maintained in inoperative positions when said carriage moves in one direction and are alternately maintained in operative positions when said carriage moves in the opposite direction.

20. A clarifier for sewage and the like comprising a tank, a carriage movable thereover, adjustable scum sweeping means and sludge scraping means carried by said carriage, and leverage mechanism for controlling the adjustment of both of said means.

21. A clarifier for sewage and the like comprising a tank, a carriage mounted for movement over the tank, means for moving the carriage back and forth over the tank, scum sweeping means and sludge scraping means carried by the carriage and adapted to alternately assume operative positions when the carriage moves in one direction and inoperative positions when the carriage moves in the opposite direction, and leverage mechanism controlled by the movement of the carriage for controlling the relative positions of both of said means.

22. A clarifier for sewage and the like comprising a tank, a carriage movable back and forth over the tank, scum sweeping means and sludge scraping means carried by the carriage and each adapted to alternately assume operative and inoperative positions, and leverage mechanism controlled by the carriage for controlling the relative positions of said means.

23. A clarifier for sewage and the like comprising a tank, a carriage mounted for movement over the tank, means for moving the carriage back and forth over the tank scum sweeping means carried by the carriage and displaceable therewith, said scum sweeping means being displaceable into scum sweeping position and to another position to clear the scum and permit a retrograde movement of the scum remover clear of the liquid in the tank, leverage mechanism for controlling the position of said scum sweeping means, and means at each end of the tank for engaging said leverage mechanism and operating the same.

24. A clarifier for sewage and the like comprising a tank, a carriage movable thereover, sludge scraping means carried by the carriage for scraping sludge from the bottom of the tank, said scraper means being relatively displaceable from a scraping position to a non-scraping position, leverage mechanism for controlling the position of said scraper means, and means at each end of the tank for operating said leverage mechanism.

25. A clarifier for sewage and the like comprising a tank, a carriage movable back and forth over the tank, adjustable scum sweeping means carried by said carriage, adjustable sludge scraping means also carried by the carriage, and leverage mechanism controlled by the position and direction of travel of the carriage for adjusting both of said means.

26. A clarifier for sewage and the like comprising a tank, a carriage movable thereover, scum sweeping means suspended from the carriage and including a transversely disposed pivoted blade for engaging the floating scum in the tank, sludge scraping means suspended from the carriage and including a transversely disposed pivoted blade for engaging the sludge in the bottom of the tank, leverage mechanism for moving said blades from substantially vertical to substantially horizontal positions, means for moving the carriage back and forth over the tank, said leverage mechanism including a pair of laterally projecting levers, each having a wedge-shaped end, and means at each end of the tank for engaging the wedge-shaped end of said levers for laterally displacing the same.

27. A clarifier for sewage and the like comprising a tank, a carriage movable thereover, scum sweeping means suspended from the carriage and including a transversely disposed pivoted blade for engaging the floating scum in the tank, sludge scraping means suspended from the carriage and including a transversely disposed pivoted blade for engaging the sludge in the bottom of the tank, leverage mechanism for moving said blades from substantially vertical to substantially horizontal positions, means for moving the carriage back and forth over the tank, and a cam at each end of the tank for engaging said leverage mechanism for laterally displacing the same.

28. In a device of the class described, the combination with a tank, of a pair of superposed blades mounted for movement back and forth through the tank, both of said blades being movable from substantially vertical to substantially horizontal positions, and means controlled by the direction of movement of the blades for controlling the relative positions of said blades.

29. In a device of the class described, the combination with a tank, of a pair of superposed blades mounted for movement back and forth through the tank, both of said blades being movable from substantially vertical to substantially horizontal positions, and means controlled by the direction of movement of the blades for controlling the relative positions of said blades, whereby one of said blades is maintained in a vertical position when moved in one direction and the other blade is maintained in a substantially horizontal position, and the relative positions of the blades are reversed when their movement in the tank is in the opposite direction.

30. In a device of the class described, the combination with a tank, of a pair of superposed blades mounted for movement back and forth through the tank, one of said blades being disposed near the top of the tank and the other blade being disposed near the bottom of the tank, both of said blades being adjustable so as to occupy substantially vertical positions and substantially horizontal positions, and means actuated by the movement of the blades through the tank for controlling the positions of said blades.

31. A clarifier for sewage and the like comprising a tank, a carriage mounted for movement over the tank, scum sweeping means and sludge scraping means carried by the carriage and adapted to alternately assume operative positions when the carriage moves in one direction and inoperative positions when the carriage moves in the opposite direction, leverage mechanism for controlling the relative positions of said scum sweeping means and said sludge scraping means, and means at each end of the tank adapted to engage said leverage mechanism and operate the same, whereby the respective positions of the scum sweeping means and sludge scraping means are adjusted.

32. A device of the class described comprising a tank, a carriage mounted for movement over the tank, a blade carried by the carriage and adapted to assume a substantially vertical position when the carriage moves in one direction and a substantially horizontal position when the carriage moves in the opposite direction, leverage mechanism also carried by the carriage for controlling the relative positions of said blade, and means at each end of the tank adapted to engage said leverage mechanism and operate the same to shift the position of said blade.

33. A clarifier for sewage and the like comprising a tank, a skimmer displaceable from end to end of said tank, and mounted to be displaced from skimming to non-skimming position, means for displacing said skimmer, and cams adjacent each end of the tank for operating said skimmer displacing means.

34. A clarifier for sewage and the like comprising a tank, a sludge scraper mounted for movement back and forth in said tank, and adapted to be displaced from scraping to non-scraping position, means for displacing said scraper, and cams adjacent each end of the tank for operating said scraper displacing means.

35. A clarifier for sewage and the like, comprising a tank, a carriage movable thereover, scum sweeping means carried by the carriage and including a blade movable into and out of scum sweeping position, means for moving the carriage alternately back and forth over the tank, leverage mechanism for positioning the blade in operative and inoperative positions, and means rendered operative by the movement of the carriage for controlling the operation of said leverage mechanism.

36. A clarifier for sewage and the like comprising a tank, a carriage movable thereover, scum sweeping means carried by the carriage and including a blade movable into and out of scum sweeping position, means for moving the carriage alternately back and forth over the tank, means for positioning the blade in operative and inoperative positions, and cams carried by the tank for controlling the operation of said blade positioning means.

37. A clarifier for sewage and the like comprising a tank, a carriage movable thereover, sludge scraping means carried by the carriage for scraping sludge from the bottom of the tank and including a blade movable into and out of sludge scraping position, means for moving the carriage alternately in opposite directions over the tank, means for positioning the sludge scraping means in operation and inoperative positions, and stationary means rendered operative by the movement of the carriage for controlling the positioning of said blade.

38. A clarifier for sewage and the like comprising a tank, a carriage movable thereover, sludge scraping means carried by the carriage for scraping sludge from the bottom of the tank and including a blade movable into and out of sludge scraping position, means for moving the carriage alternately in opposite directions over the tank, means for positioning the sludge scraping means in operative and inoperative positions, and cams for controlling the operation of said scraper positioning means.

39. In a device of the class described, the combination with a tank, of scraper means in said tank, means for moving the scraper back and forth through the tank, said scraper being adapted to assume a substantially vertical position when moved in one direction and a substantially horizontal position when moved in the opposite direction, and leverage mechanism operative when the scraper approaches an end of the tank for changing the position of the scraper.

40. In a device of the class described, the combination with a tank, of scraper means in said tank, means for moving the scraper back and forth through the tank, said scraper being adapted to assume a substantially vertical position when moved in one direction and a substantially horizontal position when moved in the opposite direction, leverage mechanism for changing the position of the scraper, and means for operating the leverage mechanism when the scraper approaches an end of the tank.

41. A clarifier for sewage and the like, comprising a tank, a carriage movable over the tank, sludge scraping means and scum sweeping means carried by the carriage, and means for adjusting the relative position of the carriage with respect to the tank to bring the scum sweeping means and the sludge scraping means to a proper and desired level.

42. A clarifier for sewage and the like, comprising a tank, a carriage movable back and forth over the tank, sludge scraping means and scum sweeping means carried by the carriage, and means for adjusting both of said means to bring the same to a proper and desired level.

In testimony whereof I hereto affix my signature.

WILLIAM H. WITHINGTON.

DISCLAIMER 1,911,008.—*William H. Withington*, New York, N. Y. LIQUID CLARIFIER. Patent dated May 23, 1933. Disclaimer filed April 12, 1935, by the patentee, the assignee, *Hardinge Company, Incorporated*, consenting and approving.

Hereby enters this disclaimer to that part of the claims in said specification which is in the following words, to wit: Claims 4, 24, and 37 of my above-identified patent, reading as follows:

"4. In a settling device the combination of a tank, scraper means in said tank, means for moving the scraper over the bottom of the tank in one direction, leverage mechanism operative when the scraper is moved in the opposite direction for raising the scraper away from the bottom of the tank, and means for removing the settled and scraped substances from the tank."

"24. A clarifier for sewage and the like comprising a tank, a carriage movable thereover, sludge scraping means carried by the carriage for scraping sludge from the bottom of the tank, said scraper means being relatively displaceable from a scraping position to a non-scraping position, leverage mechanism for controlling the position of said scraper means, and means at each end of the tank for operating said leverage mechanism."

"37. A clarifier for sewage and the like comprising a tank, a carriage movable thereover, sludge scraping means carried by the carriage for scraping sludge from the bottom of the tank and including a blade movable into and out of sludge scraping position, means for moving the carriage alternately in opposite directions over the tank, means for positioning the sludge scraping means in operation and inoperative positions, and stationary means rendered operative by the movement of the carriage for controlling the positioning of said blade."

[*Official Gazette May 7, 1935*.]